US012586087B2

(12) United States Patent
Posert

(10) Patent No.: US 12,586,087 B2
(45) Date of Patent: Mar. 24, 2026

(54) COMPUTING TOOL RISK DISCOVERY

(71) Applicant: WELLS FARGO BANK, N.A., San Francisco, CA (US)

(72) Inventor: Robert Lee Posert, San Diego, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/608,001

(22) Filed: Mar. 18, 2024

(65) Prior Publication Data

US 2024/0221003 A1 Jul. 4, 2024

Related U.S. Application Data

(63) Continuation of application No. 16/566,493, filed on Sep. 10, 2019, now Pat. No. 11,966,930.

(51) Int. Cl.
| | |
|---|---|
| *G06Q 30/018* | (2023.01) |
| *G06N 3/04* | (2023.01) |
| *G06N 3/088* | (2023.01) |
| *G06Q 40/00* | (2023.01) |

(52) U.S. Cl.
CPC ........... *G06Q 30/0185* (2013.01); *G06N 3/04* (2013.01); *G06N 3/088* (2013.01); *G06Q 40/00* (2013.01)

(58) Field of Classification Search
CPC ........ G06Q 40/06; G06Q 40/04; G06Q 10/06; G06Q 10/0635; G06Q 30/0203; G06Q 10/067; G06Q 50/18; G04Q 40/02; G04Q 30/06; G06F 11/3684; G06F 11/3608

USPC .............. 705/7.12, 35, 37, 75; 707/737, 803
See application file for complete search history.

(56) References Cited

U.S. PATENT DOCUMENTS

| | | | | |
|---|---|---|---|---|
| 5,999,884 | A | * | 12/1999 | Kriegshauser ........... G01V 3/28 |
| | | | | 702/7 |
| 6,249,770 | B1 | * | 6/2001 | Erwin ................ G06Q 30/0203 |
| | | | | 725/35 |
| 6,341,287 | B1 | * | 1/2002 | Sziklai ................... G06Q 10/06 |
| | | | | 707/999.102 |
| 7,003,560 | B1 | * | 2/2006 | Mullen .................. G06Q 10/06 |
| | | | | 709/224 |
| 7,664,712 | B1 | * | 2/2010 | Duvall ..................... G06N 5/02 |
| | | | | 707/758 |
| 7,890,545 | B1 | * | 2/2011 | Cason, Jr. .............. G06Q 10/06 |
| | | | | 707/804 |
| 8,078,485 | B1 | * | 12/2011 | Kraehmueller ...... G06Q 10/063 |
| | | | | 705/7.29 |

(Continued)

*Primary Examiner* — Olusegun Goyea
(74) *Attorney, Agent, or Firm* — Kilpatrick Townsend & Stockton LLP

(57) ABSTRACT

Risk associated with end-user computing tools can be discovered automatically. Machine learning and other approaches can be employed to automate discovery of risk associated with end-user computing tools. In one instance, a machine learning model can be constructed and fine-tuned through training that can classify end-user computing tools in terms of risk. The risk can be of a particular type, such as financial or reputational risk, and extent, such as high or low. In another instance, end-user computing tools can be subject to automatic clustering and subsequent risk assessment. Mitigation action can be performed to reduce risk associated with high-risk end-user computing tools.

20 Claims, 9 Drawing Sheets

(56) References Cited

U.S. PATENT DOCUMENTS

| | | | | |
|---|---|---|---|---|
| 8,204,809 B1 * | 6/2012 | Wise | G06Q 40/06 |
| | | | 705/36 R |
| 9,324,022 B2 | 4/2016 | Williams, Jr. et al. | |
| 10,089,581 B2 | 10/2018 | Flores et al. | |
| 10,102,241 B2 | 10/2018 | Zorn et al. | |
| 10,338,968 B2 * | 7/2019 | Bequet | H04L 67/12 |
| 10,410,121 B2 * | 9/2019 | Husain | G06N 3/045 |
| 10,503,632 B1 * | 12/2019 | Sivanantham | G06F 11/3688 |
| 10,591,638 B2 * | 3/2020 | Jing | G01V 20/00 |
| 2002/0026339 A1 * | 2/2002 | Frankland | G06F 16/951 |
| | | | 707/E17.108 |
| 2004/0237077 A1 * | 11/2004 | Cole | G06Q 10/0639 |
| | | | 717/162 |
| 2010/0332373 A1 * | 12/2010 | Crabtree | G06Q 40/04 |
| | | | 709/224 |
| 2013/0104236 A1 * | 4/2013 | Ray | H04L 63/20 |
| | | | 726/25 |
| 2014/0122486 A1 * | 5/2014 | Simard | G06N 20/00 |
| | | | 707/737 |

| | | | | |
|---|---|---|---|---|
| 2014/0136251 A1 * | 5/2014 | Bird | G06Q 10/063 |
| | | | 705/7.11 |
| 2015/0242858 A1 * | 8/2015 | Smith | G06Q 40/02 |
| | | | 705/75 |
| 2018/0040064 A1 * | 2/2018 | Grigg | H04L 41/147 |
| 2018/0053128 A1 * | 2/2018 | Costas | G06Q 50/18 |
| 2018/0189680 A1 * | 7/2018 | Gupta | G06Q 40/00 |
| 2018/0203836 A1 | 7/2018 | Singh et al. | |
| 2018/0307780 A1 * | 10/2018 | Keenan | G06F 3/0485 |
| 2018/0322107 A1 * | 11/2018 | Byun | H04L 67/02 |
| 2019/0080267 A1 * | 3/2019 | O'Brien | G06Q 40/06 |
| 2019/0122119 A1 * | 4/2019 | Husain | G06N 3/045 |
| 2019/0197442 A1 * | 6/2019 | Lu | G06N 3/0895 |
| 2019/0236448 A1 * | 8/2019 | Piatt | G06F 11/3006 |
| 2020/0004582 A1 * | 1/2020 | Fornash | G06F 9/4856 |
| 2020/0019550 A1 * | 1/2020 | Keenan | G06F 16/289 |
| 2020/0066397 A1 * | 2/2020 | Rai | G06N 20/00 |
| 2020/0104717 A1 * | 4/2020 | Alistarh | G06N 3/0495 |
| 2020/0304502 A1 * | 9/2020 | Jafari | H04L 63/029 |
| 2020/0311736 A1 * | 10/2020 | Song | G06Q 20/4016 |
| 2020/0334413 A1 * | 10/2020 | Byun | H04L 67/02 |
| 2020/0380420 A1 * | 12/2020 | Sbandi | G06N 3/088 |
| 2022/0284485 A1 * | 9/2022 | Swift | G06Q 30/0282 |

* cited by examiner

END-USER COMPUTING TOOL

— 100

— 210

SCANNER
COMPONENT

— 220

PRE-PROCESSOR
COMPONENT

— 230

MODEL
GENERATION
COMPONENT

— 240

MODEL
EXECUTION
COMPONENT

CONTEXT

CLASSIFICATION SYSTEM

RISK EXENT

APPLICATIONS  986

MODULES  984

DATA  982

OPERATING SYSTEM  980

CLASSIFICATION SYSTEM — 100

— 900

PROCESSOR(S) — 910

STORAGE DEVICE(S) — 940

930

INPUT DEVICE(S) — 950

MEMORY — 920

OUTPUT DEVICE(S) — 960

COMMUNICATION CONNECTION(S) — 970

COMPUTING DEVICE

SECOND COMPUTING DEVICE — 902

NETWORK — 990

COMPUTING TOOL RISK DISCOVERY

CROSS REFERENCE TO RELATED APPLICATION

This application claims priority to and is a continuation of U.S. patent application Ser. No. 16/566,493, filed Sep. 10, 2019, and entitled "COMPUTING TOOL RISK DISCOVERY," the entirety of which is incorporated herein by reference.

BACKGROUND

End-user computing tools are conventionally relied on heavily for decision making and financial reporting within organizations. End-user computing tools refer to a class of tools created by non-programmers. In other words, an end-user computing tool is developed by users themselves rather than professional developers. In this manner, domain experts can build their own tools. The most well-known example of an end-user computing tool is a spreadsheet. Other examples include databases, scripts, and bots, among others.

Reliance on end-user computing tools can be risky, since they are not subject to quality assurance processes typically associated with non-end-user computing tools. For instance, unintentional errors can negatively impact decision making and financial reporting. Additionally, end-user computing tools pose a risk of effecting fraud or hiding losses as well as increasing exposure to data breaches.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to automatic risk assessment and mitigation for end-user computing tools. Various machine learning and other approaches can be employed to automate risk assessment. In one instance, a machine learning model can be trained to classify risk associated with end-user computing tools including spreadsheets. Once trained, performance can be evaluated and the model fine-tuned, if needed, to achieve performance goals. The trained and optionally fine-tuned model can subsequently be employed to automatically determine risk associated with end-user tools. More particularly, a level (e.g., high, medium, low) and type (e.g., financial, reputational, regulatory . . . ) of risk can be determined. In another instance, automatic clustering of end-user computing tools can be utilized to identify similar clusters to which risk can be assigned. End-user computing tools identified as high risk can be subject to mitigation actions such as review, tracking, or monitoring.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

End-user computing tools (EUCTs), such as spreadsheets, can pose a significant risk to organizations that rely on them for decisions and financial reporting. As examples, events can be over booked and billions of dollars lost due to an error in a spreadsheet. As such, organizations can have policies that dictate that high-risk end-user computing tools be managed in some manner for example by registering and monitoring these tools. Conventionally, individuals are tasked with self-disclosing high-risk end-user computing tools. However, such manual review is problematic for a number of reasons. First, individuals are often overloaded and unmotivated to perform such an analysis. Further, even if an individual had time and was motivated, the individual may not be able to properly evaluate risk associated with an end-user computing tool in isolation. In almost all cases they need additional context, such as the business process that the tool is used for, to perform the risk analysis. Still further, larger organizations can have millions of end-user computing tools, rendering manual review impracticable and financially infeasible.

Details provided herein generally pertain to automatic discovery of risk associated with end-user computing tools. Machine learning can be exploited to automate risk detection. In one instance, a machine learning model can be generated based on training data, wherein the training data corresponds to end-user computing tools and risk labels. For instance, a number of spreadsheets can be provided with labels indicating whether a particular spreadsheet is high risk or not, and the type of risk for example, financial, to train the model in accordance with a supervised learning approach. Once trained and fine-tuned as needed, end-user computing tools can be provided and the model executed to classify each end-user computing tool in terms of risk. The risk can be classified in terms of type and extent, wherein the type of risk can be financial or reputational, for example, and the extent can be high or low. In another instance, end-user tools can be subject to automatic clustering based on similarity and subsequent risk classification. Once classified, high-risk end-user computing tools can have their risk mitigated by application of one or more actions such as review, tracking, or monitoring.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
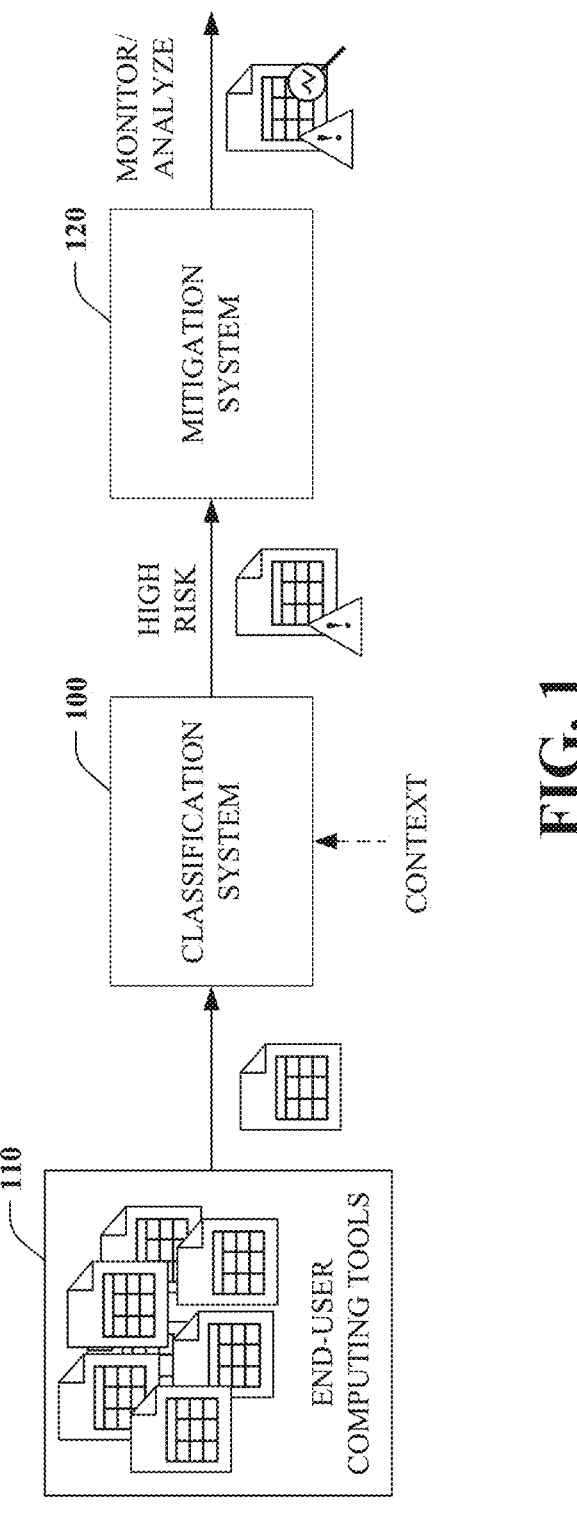
FIG. 1 illustrates an overview of an example implementation.

Referring initially to FIG. 1, an overview of an example implementation is illustrated and described. As depicted, the implementation includes classification system 100, end-user computing tools (EUCTs) 110, and mitigation system 120. The classification system 100 receives a number of end-user computing tools 110 as input. The end-user computing tools 110 correspond to a software-based tool created by an end-user, rather than a software developer, that includes at least one mathematical calculation or logical operation. The end-user computing tools 110 can include spreadsheets, databases, scripts, and bots, among others. The end-user computing tools 110 can be saved in various locations in an organization and thus a scan of the organization may be required to locate all of the end-user computing tools 110 in the organization. The number of end-user computing tools 110 can vary by organization. Nevertheless, larger organizations can include tens of millions of end-user computing tools or more.

The classification system 100 is configured to automatically discover, assess, or classify risk associated with end-user computing tools 110. Various artificial intelligence mechanisms can be employed to learn what constitutes a high-risk or low-risk end-user computing tool. For instance, a machine learning model can be created and trained to identify high and/or low risk end-user computing tools 110 utilizing a supervised learning approach and any one of a number of novel or conventional classification algorithms. Alternatively, an augmented computer vision or image analysis technique can be employed to identify risk associated with end-user computing tools 110. Other examples include natural language processing and unsupervised classification to determine the risk associated with end-user computing tools 110. In accordance with one embodiment the classification system 100 can identify type as well as extent, or level, of risk associated with an end-user computing tool 110. For example, the risk can be financial, reputational, or regulatory. Further, the classification system 100 can use context information associated with or surrounding end-user computing tools 110. Examples of such context information are title of the author of the tool, associated business processes, a news feed, tool architecture, and the presence and amount of personally identifiable information (PPI) (e.g., a Social Security number) as well as other structured or rule-based information extracted from and end-user computing tool. Unlike a manual review, however, this additional context is not a requirement for risk assessment.

The mitigation system 120 can receive high-risk end-user computing tools 110 as determined by the classification system 100. The mitigation system 120 is configured to reduce the risk associated with high-risk end-user computing tools. In accordance with one embodiment, the mitigation system 120 can solicit review of a high-risk end-user computing tool. Additionally, or alternatively, the mitigation system 120 can register a high-risk end-user computing tool as well as initiate tracking or monitoring to potentially reduce impact of a high-risk end-user computing tool.

Figure 2:
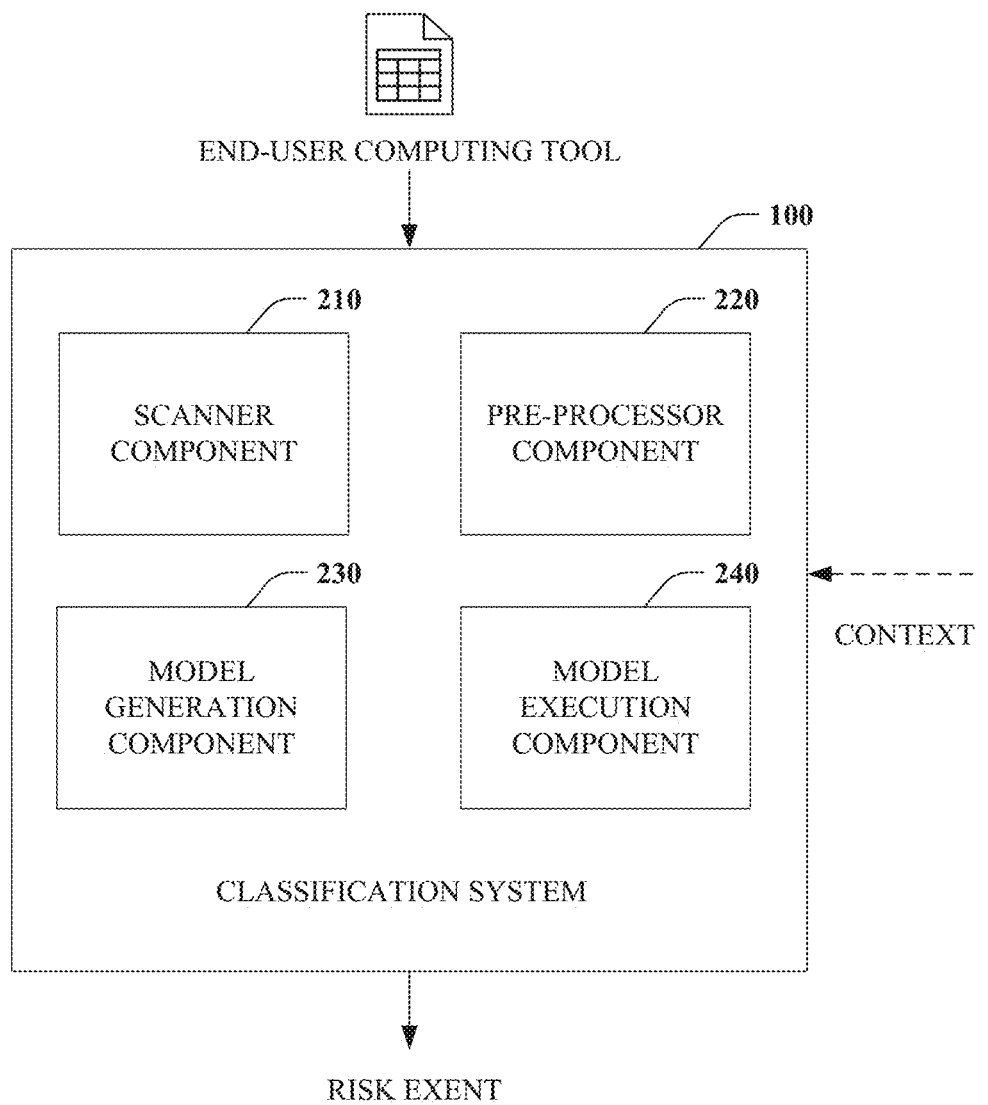
FIG. 2 is a schematic block diagram of a classification system.

Turning attention to FIG. 2, a schematic block diagram of the classification system 100 is depicted. The classification system 100 includes scanner component 210, pre-processor component 220, model generation component 230, and model execution component 240. The scanner component 210 is configured to locate end-user computing tools 110 for subsequent analysis and risk evaluation. The scanner component 210 can search organization storage locations (e.g. hard drives, servers, cloud storage, enterprise content management systems) to locate such tools. The scanner component 210 can search for file extensions associated with particular end-user computing tools (e.g., xsl, 123, gsheet, wdb, odb, mdf . . . ). Additionally, or alternatively, the scanner component 210 can analyze files (e.g. collections of data with a name) to determine if the files are end-user computing tools 110. For example, an end-user computing tool can be identified if a file relates to a software-based tool that includes at least one mathematical calculation or logical operation specified by an end user.

The preprocessor component 220 is configured to perform one or more operations with respect to end-user computing tools 110 for subsequent employment in risk analysis processes. In one embodiment, the preprocessor component 220 can transform an end-user computing tool into a form acceptable for further processing. Among other things, operations can include extracting or unzipping files or generating a bundle representation for batch transmission or processing. In another embodiment, the preprocessor component 220 can extract context from end-user computing tools 110 such as author, user, business unit, large dollar amounts, etc.

The model generation component 230 is configured to generate a model that can be executed to automatically determine risk associated with an end-user computing tool 110. In accordance with one embodiment, the model can be a machine learning model. A machine learning model can be employed to classify documents in terms of risk including type of risk (e.g. financial, reputational . . . ) and extent of risk (e.g., high, low, unknown . . . ). This may be combined with an unsupervised classification technique. For example, a machine learning model may determine the extent of the risk, while the unsupervised classification component determines the type of risk.

Figure 3:
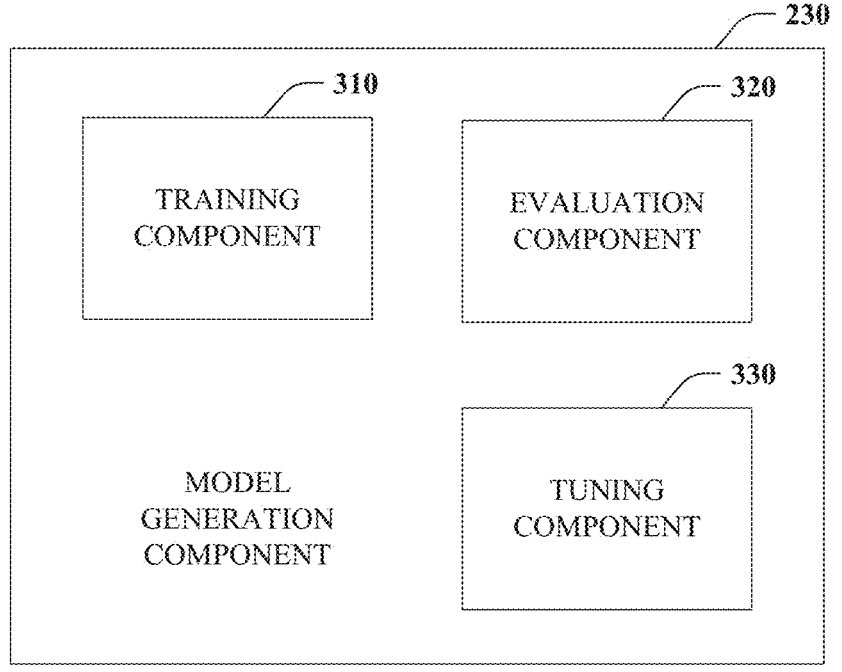
FIG. 3 is a schematic block diagram of a model generation component.

Turning attention to FIG. 3, an exemplary model generation component 230 is illustrated in further detail. The model generation component 230 includes training component 310, evaluation component 320, and tuning component 330.

The training component 310 employs training data to train a machine learning model. In other words, the model is configured for a particular scenario with training data. In accordance with a supervised learning approach, the training data can correspond to end-user computing tools with labels indicating risk extent and/or type. Training data thus corresponds to end-user computing tools that have been pre-classified, for example manually. The machine learning model learns to classify end-user computing tools based on the training data.

The evaluation component 320 provides a mechanism to evaluate the performance of a model after training. The evaluation component 320 provides end-user computing tools with known risk to the trained model. Subsequently, the evaluation component 320 can compare the response of the model to the known risk to evaluate performance. In one instance, a set of end-user computing tools with risk labels can be bifurcated into two sets one for training and one for evaluation. A performance profile can be computed utilizing various metrics or statistic measures to capture overall performance.

The tuning component 330 can receive the performance profile produced by the evaluation component 320 and compare the performance with desired performance. If the model is underperforming with respect to expected performance, actions can be taken to improve or fine-tune performance to that it meets expectations. More specifically, the tuning component can adjust model parameters or weights to improve model accuracy. This can involve retraining of the model with the previous training data or new training data as well as utilizing back propagation, which fine tunes weights based on an error rate in a previous iteration.

Returning back to FIG. 2, once a model is produced, for instance by way of training and fine tuning, the model can be executed by the model execution component 240. The model execution component 240 receives an end-user computing tool 110 as input and outputs risk information in response. Stated differently, the input tool is classified in terms of risk. For example, extent, or level, of risk can be returned including two or more classifications, such as high, low, or needs manual review. Furthermore, the result can concern one or more particular types of risk such as financial risk and reputational risk.

Financial and reputational risks are distinct from technical risk associated with an end-user computing tool. Financial risk concerns a potential for financial loss. Reputational risk pertains to loss resulting from damage to an organization's reputation or good standing. Technical risks concern the structure of end-user computing tools. For example, technical risks associated with a spreadsheet can include the presence of hidden cells, accuracy of complex computations, as well as identification of particular terms. Although there can be some spillover, technical risk is distinct from financial and reputation risk as well as other risks such as regulatory risk.

In accordance with one aspect of the subject disclosure, end-user computing tools alone are utilized as the basis for model generation and classification by the classification system 100. However, other context information can optionally be employed to improve classification. Such context information can include business processes associated with a tool, title of a person that utilizes a tool (e.g. vice president, seller . . . ), features of the tool such as deals over a million dollars, and news feeds. In fact, substantially any information about an organization or produced by the organization can be employed as context to improve classification performance.

Figure 4:
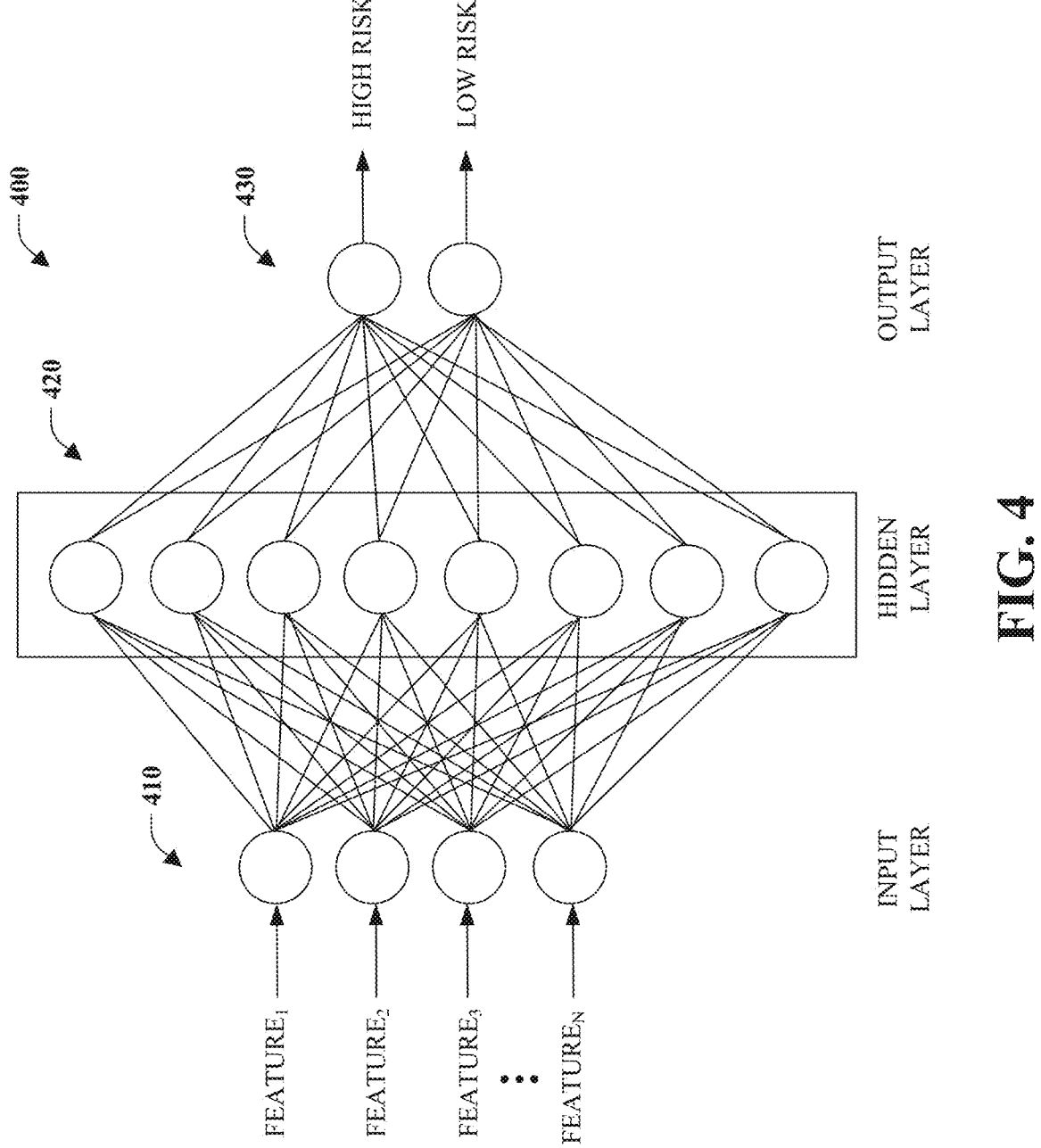
FIG. 4 depicts an exemplary artificial neural network for risk assessment.

FIG. 4 depicts a sample artificial neural network 400 that can be employed in conjunction with classifying risk associated with end-user computing tools. The artificial neural network 400 includes a number of artificial neurons represented by circles and connections between the artificial neurons. Each artificial neuron is represented by a value that represents all inputs to the neuron. There are three groups of artificial neurons, input layer 410, hidden layer 420, and output layer 430. The input layer 410 comprises artificial input neurons that bring initial data into the system and pass the data to the hidden layer 420. As shown, the input layer 410 can receive data corresponding to various features (FEATURE$_1$-FEATURE$_N$, wherein "N" is an integer greater than one) of end-user computing tools. Features are measurable properties of end-user computing tools. The features can be manually specified or automatically determined. For instance, one feature can capture one or more business processes associated with an end-user computing tool or amount of money being dealt with by a tool. In accordance with one embodiment, particular features can be automatically identified based on training data comprising a set of end-user computing tools. The hidden layer 420 is the portion of the artificial neural network 400 that is capable of learning. The hidden layer 420 nodes perform computations and transfer information from input to output nodes. Here, the neural network 400 can learn to identify risk by way of supervised learning, unsupervised learning, or reinforcement learning in conjunction with forward and backward propagation. Nodes that comprise the output layer 430 are responsible for computations and transferring information from the neural network 400 to the outside world. Here, the output layer 430 comprises a node that identifies risk associated with an end-user computing tool, namely high risk or low risk. Of course, additional or alternate classifications are possible including an intermediate risk that requires manual review. Further, a type of risk, such as financial or reputational, can be identified or additional artificial neural networks can be produced for each type of risk, optionally linked in a deep learning approach.

The classification system 100 has been described mainly with respect to a supervised learning approach, wherein a training set is utilized to configure a model. However, the classification system 100 is not so limited. In accordance with another embodiment an unsupervised learning approach can be employed, which does not require a training set. More specifically, an unsupervised learning approach can be employed that performs cluster analysis. In this case, end-user computing tools can be automatically clustered into groups or clusters based on similarity, for instance utilizing document clustering. Alternatively, natural language processing and text analysis can be employed to automatically classify end-user computing tools. Once bucketed into clusters or classes, risk analysis can be performed manually by assigning risk to the clusters or classes. By way of example, a set of end-user computing tools can be provided to such a classification system 100 with no other input, and the classification system 100 would assign the end-user computing tools to clusters based on similarity. The result could be three distinct groups of tools that an individual could utilize to identify high-risk end-user tools. As such, this approach can be deemed semi-automatic. Nevertheless, in one embodiment, such clustering can be utilized to generate or augment a training set for supervised learning. For instance, cluster analysis can be utilized to add additional context to a training set.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, natural language processing, automatic categorization, classifiers . . . ). Such components, inter alia, can automate certain mechanisms or processes performed thereby to make portions of the systems and methods more adaptive as well as efficient and intelligent. By way of example, and not limitation, such mechanisms can be utilized by the classification system 100 to automatically determine risk associated with end-user computing tools.

Figure 5:
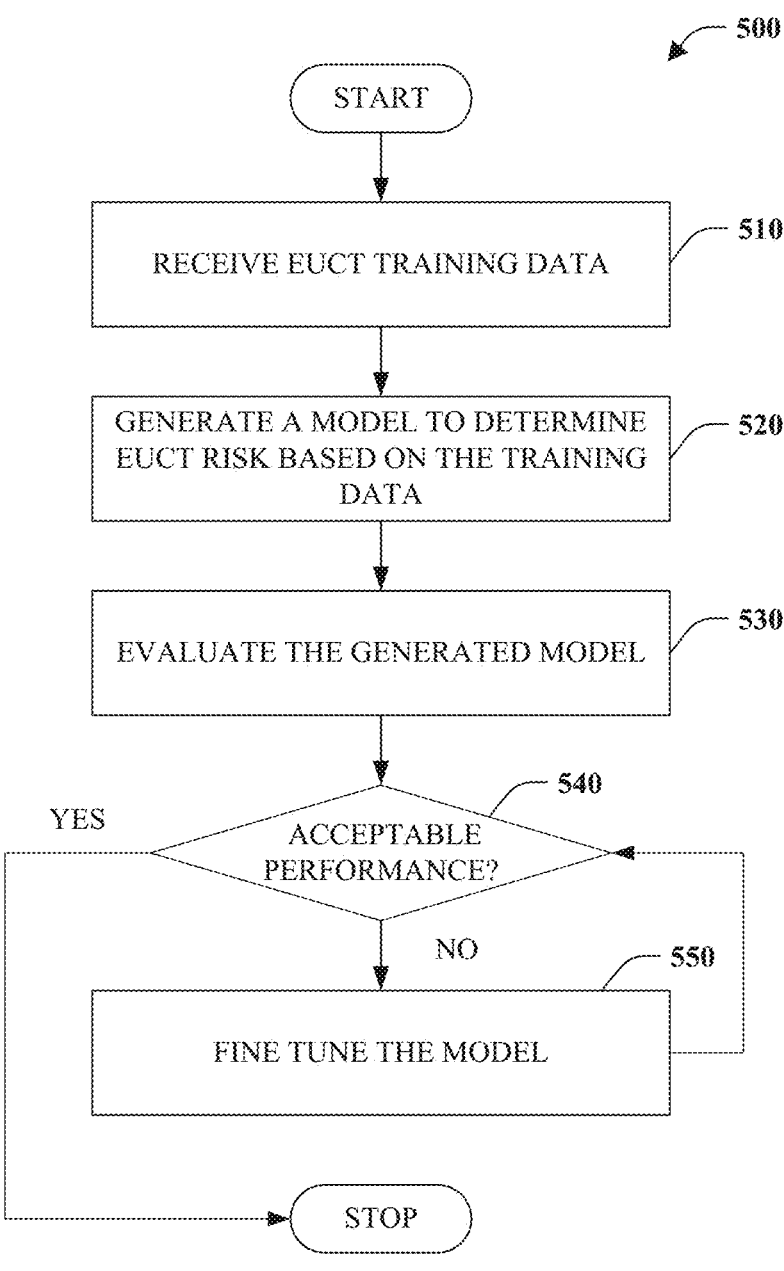
FIG. 5 is a flow chart diagram of a method of generating a model associated with assessment of risk for end-user computing tools.
Figure 6:
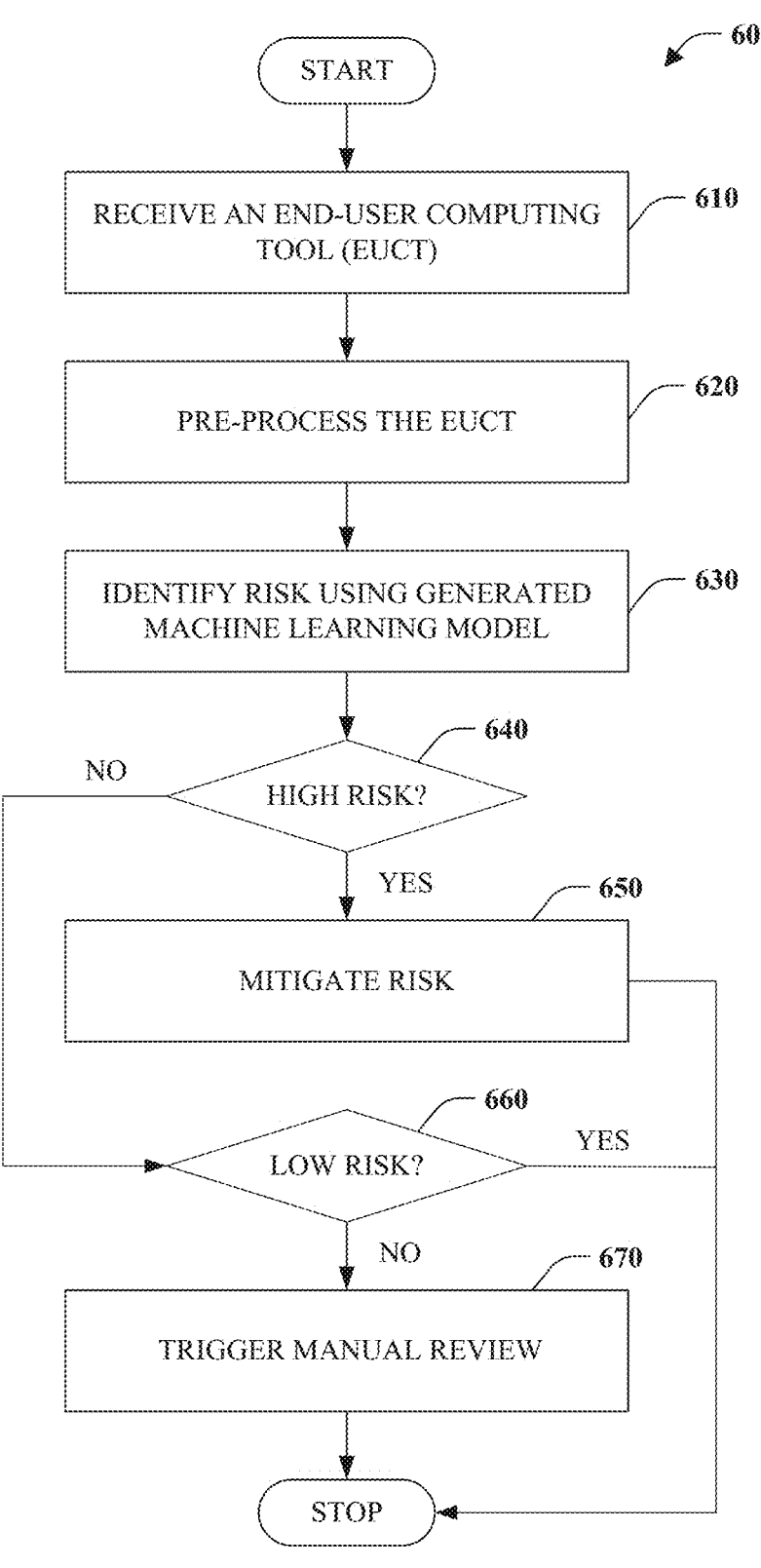
FIG. 6 is a flow chart diagram of a method of risk classification associated with end-user computing tools.
Figure 7:
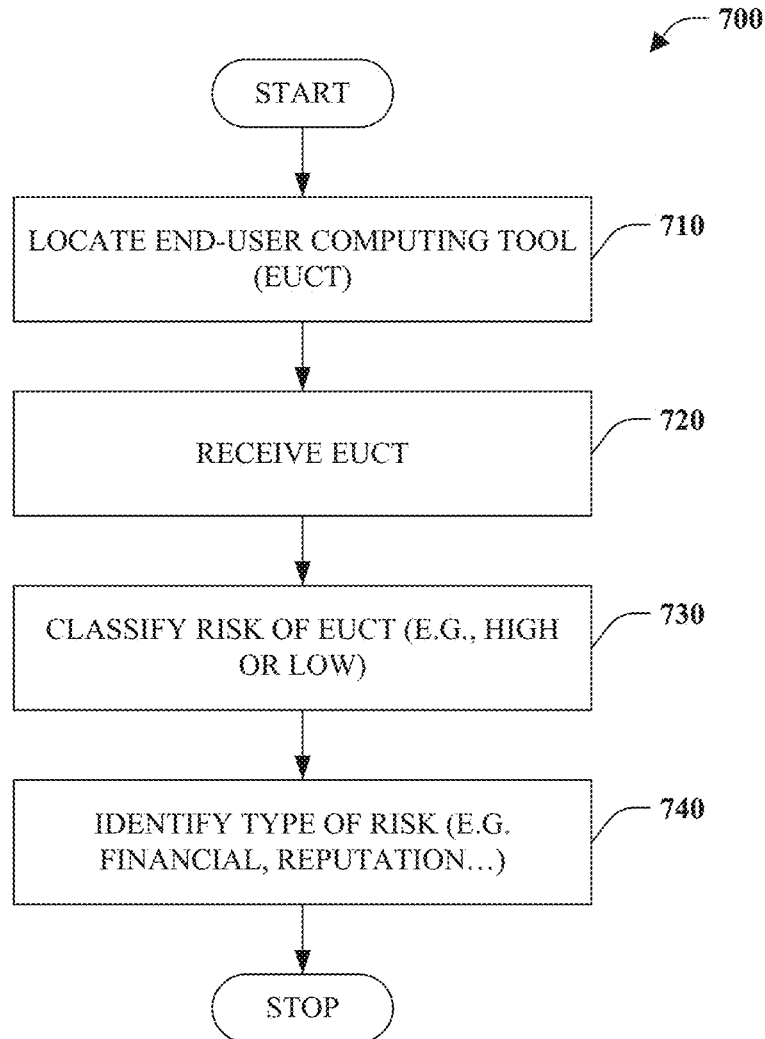
FIG. 7 is a flow chart diagram of a method of risk classification.

In view of the exemplary systems described above, methods that may be implemented in accordance with the disclosed subject matter will be better appreciated with reference to flow chart diagrams of FIGS. 5-7. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

FIG. 5 illustrates a method 500 of generating a machine learning model associated with risk assessment of end-user computing tools. The method 500 can be performed by the model generation component 230 of classification system 100. At numeral 510, end-user computing tool training data is received. The training data can comprise an end-user computing tool, or features of such a tool, and labels indicating a risk associated with each end-user computing tool. In accordance with one embodiment, a set of data including end-user computing tools and risk labels can be partitioned for training data, while other portions can be utilized for evaluation and fine tuning. At 520, a machine learning model is generated based on the training data to determine risk associated with an end-user computing tool. In other words, a data model is fitted to the training data. Various algorithms can be employed in conjunction with a bi-class (e.g., high risk, low risk) or multi-class (high risk, intermediate risk, low risk, unknown) problem including linear classifiers, support vector machines, naive Bayes classifier, decision trees, random forest, natural language processing, automatic categorization, and neural networks, among others. At 530, the generated model is evaluated. Evaluation can be accomplished by executing the model over end-user computing tools with known risk and comparing the predicted risk with the known risk. Further metrics or statistics can be generated to produce a performance profile. At 540, a determination is made as to whether or not the performance is acceptable based on the performance profile, for example. If the performance is acceptable ("YES"), the method 500 simply terminates without further action. If the performance is unacceptable ("NO"), the method 500 continues at 550 where the model is fine tuned. More specifically, model parameters or weights can be adjusted to achieve improved performance. In one instance, this can be accomplished with additional model training with the same training data or different training data. After fine tuning at 550, the method 500 loops back to 540, wherein the performance is again analyzed. The method 500 terminates after the performance is deemed acceptable at 540.

FIG. 6 illustrates a method 600 of risk classification associated with end-user computing tools. The method 600 can be performed by the classification system 100 and mitigation system 120. At numeral 610, an end-user computing tool (EUCT) is received for processing. At 620, pre-processing is performed on the end-user computing tool, if necessary, to prepare the end-user computing tool for classification. For example, the end-user computing tool may be required to be in a particular form. At 630, risk associated with the end-user computing tool is identified, for example utilizing a machine learning model. Such risk can correspond to security, reputation, or regulatory risk. At 640, a determination is made as to whether or not the risk associated with an end-user computing tool is high. If the risk is high ("YES"), the method 600 continues at 650 where the risk is mitigated. For example, some management or control can be provided with respect to a high risk end-user computing tool. Subsequently, the method 600 can terminate. However, if the risk is not high ("NO"), the method continues at 660 where a determination is made as to whether or not the risk is low. If the risk is low ("YES") the method terminates successfully without further action. If the risk is not low ("NO"), the method 600 continues at 670, where a manual review is triggered. In other words, if a tool is neither high risk nor low risk, it can be some intermediate risk level that can be evaluated by a human user. The system may also return a level of confidence in the risk that aligns with this intermediate state. For example, if the system returns a 70% chance of a high risk, it may trigger a manual review.

FIG. 7 illustrates a method of risk classification 700. At numeral 710, an end-user computing tool (EUCT) is located. In accordance with one embodiment, computer storage systems of an organization can be scanned to locate such tools for example based on extensions or characteristics associated with the tools. At reference 720, a located end-user computing tool is received, retrieved, or otherwise obtained or acquired for further processing.

At numeral 730, risk assessment is performed automatically on the end-user computing tool to classify the tool in terms of risk extent (e.g., high, low, intermediate . . . ). In accordance with one embodiment, a machine learning model can be trained and refined to classify end-user computing tool risk in accordance with a supervised learning approach. Various algorithms can be implemented by the machine learning model including linear classifiers, support vector machines, naive Bayes classifier, decision trees, random forest, natural language processing, automatic categorization, and neural networks, among others. In accordance with one embodiment, features indicative of risk extent can be specified. Alternatively, features can be determined automatically based on training data. In addition to determining the classification a confidence score can also be provided to indicate the level of confidence associated with the classification. For example, output of a classifier can be that a particular end-user computing tool is high risk with ninety percent confidence.

At 740, a type of risk associated with the risk extent is identified. In accordance with one aspect multiple machine learning models can be employed to determine different types of risks such as financial, reputational, and regulatory. Alternatively, a single model can be constructed that performs classification with respect to various risk types. Regardless of implementation, various types of risk can be determined with respect to an end-user computing tool. For example, an end-user tool can be classified as low risk for financial and regulatory purposes but high risk for reputational damage.

Figure 8:
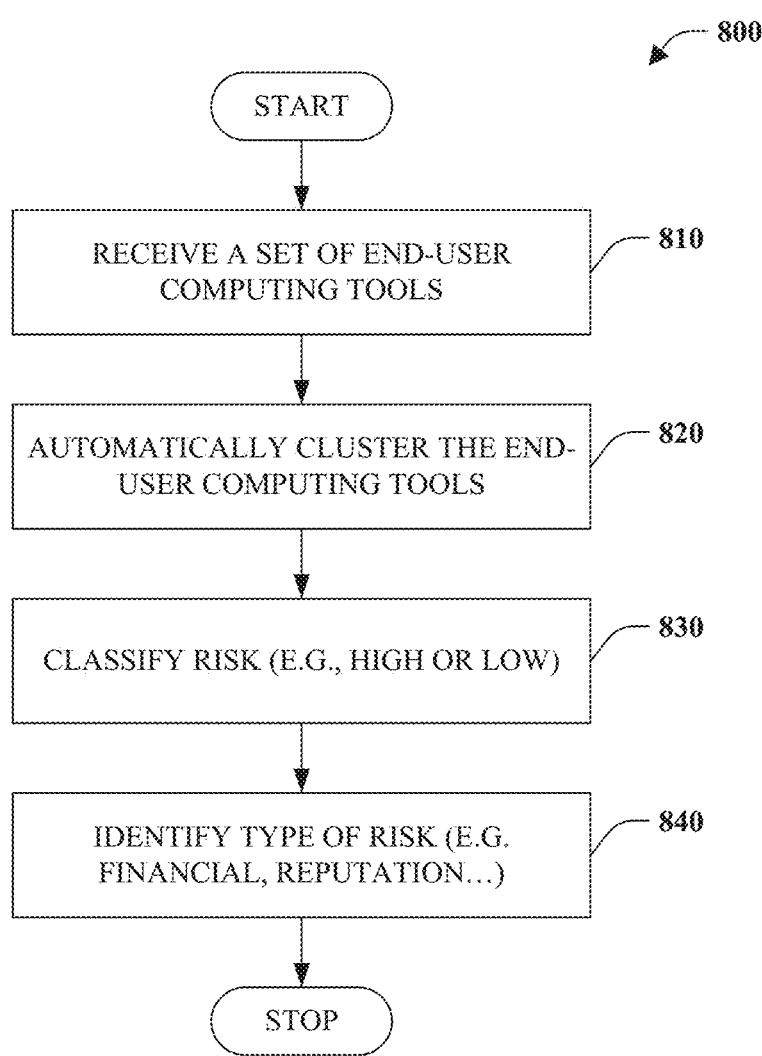
FIG. 8 is a flow chart diagram of a method of assessing end-user computing tool risk.

FIG. 8 depicts a flow chart diagram of a method 800 of assessing end-user computing tool risk. At numeral 810, a set of end-user tools can be received, for example from one or more storage locations. At 820, the set of end-user tools is automatically clustered. In one embodiment, an unsupervised learning approach can be employed, such as document cluster, to group textually similar end-user computing tools together. In other embodiments, natural language processing and text analysis can be employed. At 830, risk is classified for each cluster. For example, the risk can be high or low. At 840, the type of risk is identified for each cluster, such as financial, reputation, or regulatory. Although identification risk level and type can be automated, in one instance, such tasks can be performed manually by an individual. For example, an individual can examine the clusters and label them with a risk level and type.

In accordance with one embodiment, a policy can be established that dictates which end-user computing tools are subject to risk mitigation action. Essentially, the policy can define what is deemed risky, which can be automatically learned or specifically specified. In a first portion of a policy, an end-user computing tool can be defined. For example, an end-user computing tool can be a software-based tool that contains at least one mathematical calculation or logical operation. Further, the policy can indicate that an end-user computing tool is risky if it is used in a high-risk process, includes customer information, or is employed in business processes which could result in negative customer impact. Further, an end-user tool can be designated risky if it is associated with a process that itself is subject to other risk mitigation controls. For example, if an employee deals with customer money in a banking context, they may be required to take at least a week vacation every year as a type of control so that any misconduct can be detected by another employee filling in for the vacationing employee. If a spreadsheet is associated with such a control, it can be deemed high risk.

The subject disclosure provides for various products and processes that perform, or are configured to perform risk assessment and mitigation associated with end-user computing tools. What follows are one or more exemplary systems and methods.

A system comprises a processor coupled to a memory that includes instructions that when executed by the processor cause the processor to: receive an end-user computing tool; automatically determine a risk level associated with the end-user computing tool with a machine learning model, wherein the risk level pertains to one of financial or reputational risk; and apply a mitigation action to the end-user computing tool when the risk exceeds a predetermined threshold. In one instance, the end-user computing tool is a spreadsheet. The mitigation action further comprises application of a control to monitor the end-user computing tool. The system further comprises instructions that cause the processor to locate the end-user computing tool and pre-process the end-user computing tool prior to providing the end-user computing tool to the machine learning model. In one instance, the machine learning model is adapted from an industry standard model, wherein the industry corresponds to financial services.

A method comprises executing, on a processor, instructions that cause the processor to perform operations comprising: receiving training data comprising end-user computing tools with risk labels; determining features and adjusting parameter values of a machine learning model automatically based on training data; and fine tuning the parameter values after performance of the machine learning model is determined to be below a predetermined threshold. The method further comprises instructions that cause the processor to perform an operation comprising receiving context outside the end-user computing tool as training data. In one instance, receiving the context comprises receiving a list of business processes associated with the end-user computing tool. In another instance, receiving the context comprises receiving a title of a person that uses the end-user computing tool. The method further comprises instructions that cause the processor to perform an operation comprising automatically determining risk associated with an input end-user computing tool with the machine learning model, wherein determining the risk comprises determining a risk type and extent, wherein the risk type is one of financial, reputational, or regulatory. The method further comprises instructions that cause the processor to perform an operation comprising applying a mitigating action to an end-user computing tool deemed to have a risk level higher than a predetermined threshold.

A method comprises executing, on a processor, instructions that cause the processor to perform operations comprising: receiving a spreadsheet; automatically determining a risk associated with the spreadsheet with a machine learning model, wherein the risk pertains to one of financial or reputational risk; and applying a mitigation action to the spreadsheet when the risk is deemed to exceed a predetermined threshold. The method further comprises instructions that cause the processor to perform an operation comprising forwarding the spreadsheet to an individual for manual review if the risk exceeds a first predetermined value associated with low risk and is below a second predetermined value associated with high risk. In one instance, determining the risk comprises determining risk type and extent.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 9:
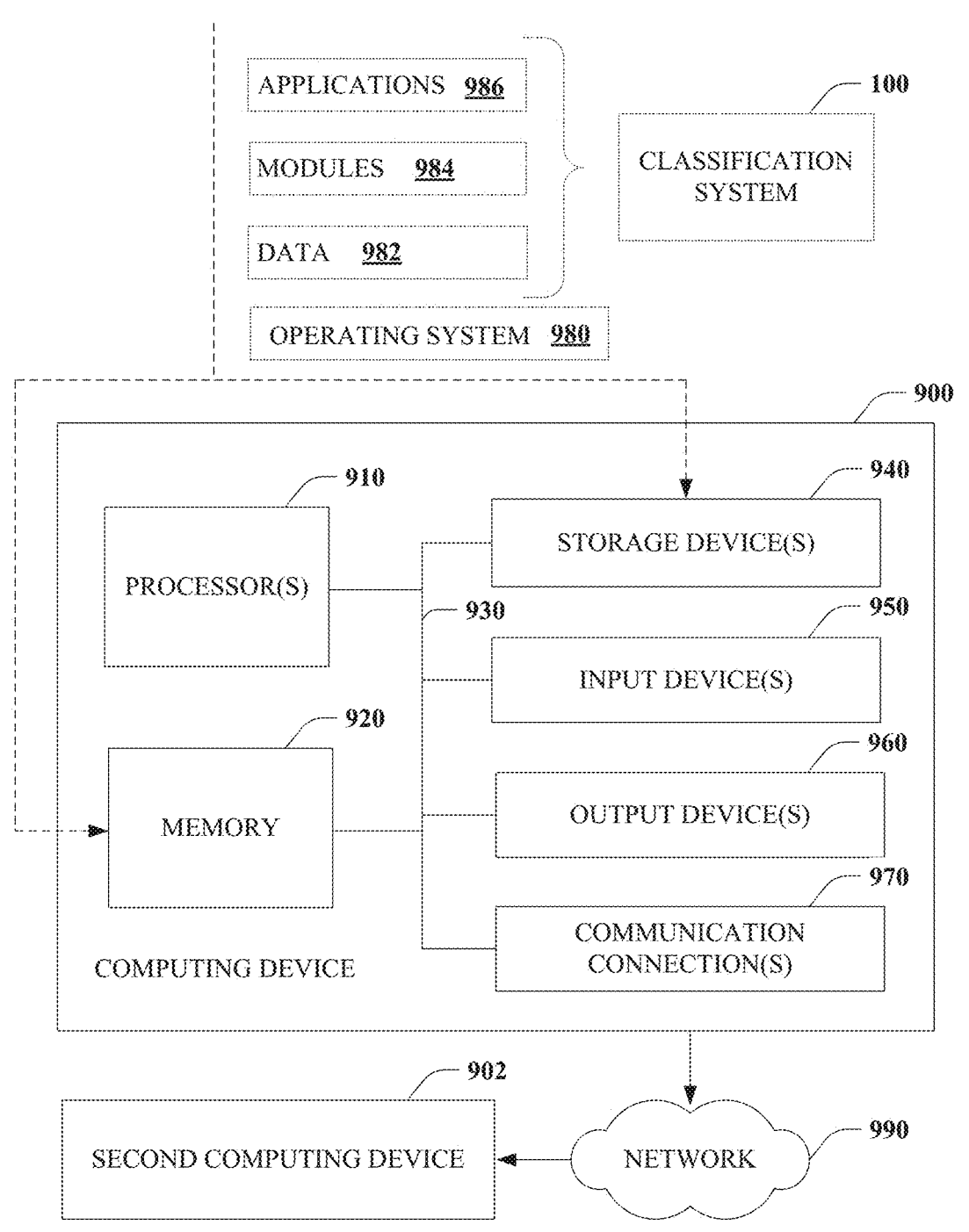
FIG. 9 is a schematic block diagram illustrating a suitable operating environment for aspects of the subject disclosure.

To provide a context for the disclosed subject matter, FIG. 9 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 9, illustrated is an example computing device 900 (e.g., desktop, laptop, tablet, watch, server, hand-held, programmable consumer or industrial electronics, set-top box, game system, compute node . . . ). The computing device 900 includes one or more processor(s) 910, memory 920, system bus 930, storage device(s) 940, input device(s) 950, output device(s) 960, and communications connection(s) 70. The system bus 830 communicatively couples at least the above system constituents. However, the computing device 800, in its simplest form, can include one or more processors 810 coupled to memory 820, wherein the one or more processors 810 execute various computer executable actions, instructions, and or components stored in the memory 820.

The processor(s) 810 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 810 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 810 can be a graphics processor unit (GPU) that performs calculations with respect to digital image processing and computer graphics.

The computing device 800 can include or otherwise interact with a variety of computer-readable media to facilitate control of the computing device to implement one or more aspects of the disclosed subject matter. The computer-readable media can be any available media that accessible to the computing device 800 and includes volatile and non-volatile media, and removable and non-removable media. Computer-readable media can comprise two distinct and mutually exclusive types, namely storage media and communication media.

Storage media includes volatile and nonvolatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 800. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 820 and storage device(s) 840 are examples of computer-readable storage media. Depending on the configuration and type of computing device, the memory 820 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 800, such as during start-up, can be stored in nonvolatile memory, while volatile memory can act as external cache memory to facilitate processing by the processor(s) 810, among other things.

The storage device(s) 840 include removable/non-removable, volatile/non-volatile storage media for storage of vast amounts of data relative to the memory 820. For example, storage device(s) 840 include, but are not limited to, one or more devices such as a magnetic or optical disk drive, floppy disk drive, flash memory, solid-state drive, or memory stick.

Memory 820 and storage device(s) 840 can include, or have stored therein, operating system 880, one or more applications 886, one or more program modules 884, and data 882. The operating system 880 acts to control and allocate resources of the computing device 800. Applications 886 include one or both of system and application software and can exploit management of resources by the operating system 980 through program modules 984 and data 982 stored in the memory 920 and/or storage device(s) 940 to perform one or more actions. Accordingly, applications 986 can turn a general-purpose computer 900 into a specialized machine in accordance with the logic provided thereby.

All or portions of the disclosed subject matter can be implemented using standard programming and/or engineering techniques to produce software, firmware, hardware, or any combination thereof to control the computing device 900 to realize the disclosed functionality. By way of example and not limitation, all or portions of the classification system 100 can be, or form part of, the application 986, and include one or more modules 984 and data 982 stored in memory and/or storage device(s) 940 whose functionality can be realized when executed by one or more processor(s) 910.

In accordance with one particular embodiment, the processor(s) 910 can correspond to a system on a chip (SOC) or like architecture including, or in other words integrating, both hardware and software on a single integrated circuit substrate. Here, the processor(s) 910 can include one or more processors as well as memory at least similar to the processor(s) 910 and memory 920, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the classification system 100 and/or functionality associated therewith can be embedded within hardware in a SOC architecture.

The input device(s) 950 and output device(s) 960 can be communicatively coupled to the computing device 900. By way of example, the input device(s) 950 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 960, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 950 and output device(s) 960 can be connected to the computing device 900 by way of wired connection (e.g., bus), wireless connection (e.g., Wi-Fi, Bluetooth . . . ), or a combination thereof.

The computing device 900 can also include communication connection(s) 970 to enable communication with at least a second computing device 902 by means of a network 990. The communication connection(s) 970 can include wired or wireless communication mechanisms to support network communication. The network 990 can correspond to a local area network (LAN) or a wide area network (WAN) such as the Internet. The second computing device 902 can be another processor-based device with which the computing device 900 can interact.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method comprising:
   receiving training data comprising end-user computing tools with risk labels, the end-user computing tools corresponding to software-based tools that perform a mathematical calculation or logical operation;

determining, using a machine learning model comprising multiple neural networks, where each neural network of the of the multiple neural networks is trained to identify a unique type of risk, a risk type associated with an end-user computing tool;

adjusting parameter values of the machine learning model based on training data associated with multiple end-user computing tools;

determining performance of the machine learning model; and if performance is determined to be below a threshold, tuning parameter values of the machine learning model via back propagation.

2. The method of claim 1, further comprising receiving context outside the end-user computing tools as training data.

3. The method of claim 2, wherein receiving the context outside the end-user computing tools comprises receiving a list of business processes associated with the end-user computing tools.

4. The method of claim 2, wherein receiving the context outside the end-user computing tools comprises receiving a title of a person that uses the end-user computing tools.

5. The method of claim 1, further comprising determining risk associated with an input end-user computing tool with the machine learning model.

6. The method of claim 5, wherein determining the risk comprises determining a risk type and level, wherein the risk type is one of financial, reputational, or regulatory.

7. The method of claim 5, further comprising applying a mitigating action to an end-user computing tool deemed to have a risk level higher than a predetermined threshold.

8. The method of claim 1, wherein the machine learning model comprises an unsupervised learning model that automatically clusters computing tools based on similarity.

9. The method of claim 1, wherein a first neural network of the multiple neural networks is trained to identify a reputational risk and wherein a second neural network of the multiple neural networks is trained to identify a financial risk.

10. The method of claim 1, wherein the machine learning model comprises a product of supervised learning and a classification process.

11. A system comprising:
   a processor configured to:
      receive training data comprising end-user computing tools with risk labels, the end-user computing tools corresponding to software-based tools that perform a mathematical calculation or logical operation;
      determine, using a machine learning model comprising multiple neural networks, where each neural network of the of the multiple neural networks is trained to identify a unique type of risk, a risk type associated with an end-user computing tool;
      adjust parameter values of the machine learning model based on training data associated with multiple end-user computing tools;
      determine performance of the machine learning model; and
      if performance is determined to be below a threshold, tune parameter values of the machine learning model via back propagation.

12. The system of claim 11, wherein the processor is further configured to receive context outside the end-user computing tools as training data.

13. The system of claim 12, wherein receiving the context outside the end-user computing tools comprises receiving a list of business processes associated with the end-user computing tools.

14. The system of claim 12, wherein receiving the context outside the end-user computing tools comprises receiving a title of a person that uses the end-user computing tools.

15. The system of claim 11, wherein the processor is further configured to determine risk associated with an input end-user computing tool with the machine learning model.

16. The system of claim 15, wherein determining the risk comprises determining a risk type and level, wherein the risk type is one of financial, reputational, or regulatory.

17. The system of claim 15, wherein the processor is further configured to apply a mitigating action to an end-user computing tool deemed to have a risk level higher than a predetermined threshold.

18. The system of claim 11, wherein the machine learning model comprises an unsupervised learning model that automatically clusters computing tools based on similarity.

19. The system of claim 11, wherein a first neural network of the multiple neural networks is trained to identify a reputational risk and wherein a second neural network of the multiple neural networks is trained to identify a financial risk.

20. A non-transitory computer readable medium comprising program code that, when executed by one or more processors, is configured to cause the one or more processors to perform steps comprising:

receiving training data comprising end-user computing tools with risk labels, the end-user computing tools corresponding to software-based tools that perform a mathematical calculation or logical operation;

determining, using a machine learning model comprising multiple neural networks, where each neural network of the of the multiple neural networks is trained to identify a unique type of risk, a risk type associated with an end-user computing tool;

adjusting parameter values of the machine learning model based on training data associated with multiple end-user computing tools;

determining performance of the machine learning model; and if performance is determined to be below a threshold, tuning parameter values of the machine learning model via back propagation.

\* \* \* \* \*